L. S. CHADWICK.
JOINT.
APPLICATION FILED JUNE 20, 1914.

1,274,988.

Patented Aug. 6, 1918.

Witnesses:
R. L. Bruck.
H. B. McGill.

Inventor
Lee S. Chadwick
By Hull and Smith
Attys.

UNITED STATES PATENT OFFICE.

LEE S. CHADWICK, OF CLEVELAND, OHIO, ASSIGNOR TO THE CLEVELAND METAL PRODUCTS COMPANY, OF CLEVELAND, OHIO, A CORPORATION OF OHIO.

JOINT.

1,274,988.  Specification of Letters Patent. Patented Aug. 6, 1918.

Application filed June 20, 1914. Serial No. 846,405.

*To all whom it may concern:*

Be it known that I, LEE S. CHADWICK, a citizen of the United States, residing at Cleveland, in the county of Cuyahoga and State of Ohio, have invented a certain new and useful Improvement in Joints, of which the following is a full, clear, and exact description, reference being had to the accompanying drawings.

This invention relates to joints, and it has for its object to provide a fluid-tight joint, of simple construction, by which two vessels may be quickly and cheaply connected and through which intercommunication is established between the vessels.

The parts comprising my joint may be made in quantities, by machinery (thus reducing the cost of production to a minimum) and assembled by the use of an ordinary screw-driver or other such tool, and because of the character and formation of certain of the parts, the joint is rendered absolutely fluid-tight.

Figure 1:
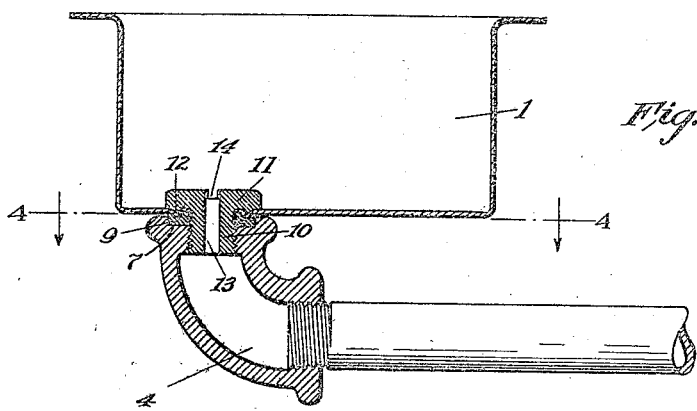
Figure 2:
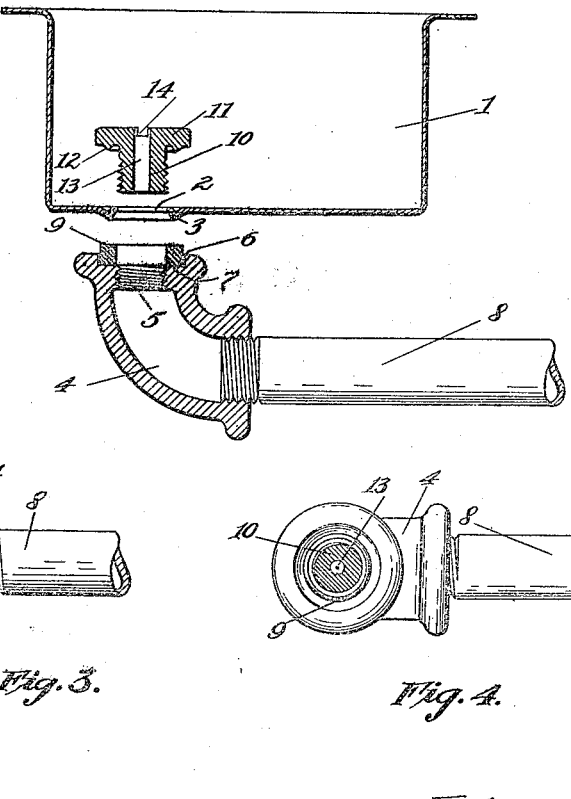
Figure 3:
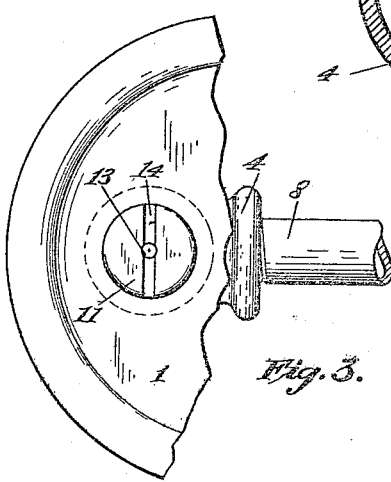
Figure 4:
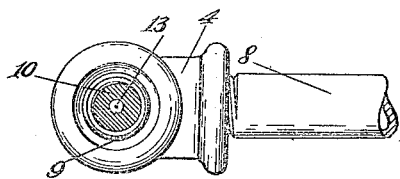

In the drawings, Figure 1 represents a central vertical section through a receptacle or reservoir that is connected to a pipe fitting by my improved joint; Fig. 2 is a view, similar to Fig. 1, of the same elements that are shown in the former figure, but illustrating them as they would appear before the parts of the joint are assembled; Fig. 3 is a fragmentary plan of the parts shown in Fig. 1; and Fig. 4 is a sectional detail on the line 4—4 of Fig. 1.

In the drawing, I have shown one of the vessels as consisting of a comparatively thick, sheet-metal receptacle or reservoir 1 having an aperture 2 in its bottom wall. A bead 3 is formed by depressing the metal a short distance from the edge of the aperture, and this bead is preferably V-shape in cross section, and it will be noted that its inner slope is shorter than its outer, as shown very clearly in Fig. 2. The vessel to which the sheet metal receptacle 1 is joined, is shown in the drawings as a pipe fitting 4. The upper end of this fitting has a threaded opening 5, and is recessed at 6 to form a shoulder 7 about said opening. I have shown the opposite end of the fitting 4 internally threaded for the reception of the end of a pipe 8.

9 represents a compressible packing device in the form of a washer, that is preferably made of a soft metal, such as lead, and the original size and shape of this washer permits it to fit rather loosely within the recess 6 and rest upon the shoulder 7, it being noted that the recess 6 is of a depth less than the thickness of the packing device or washer 9. A screw 10 is adapted to be passed downward through the aperture 2 of the receptacle, through the opening of the washer 9, and threaded into the opening 5 of the fitting 4. The screw has a head 11, upon the underneath side of which is formed an annular ridge 12 that has a comparatively sharp edge. It will be noted that the ridge 12 is triangular in cross section and that its inner slope is shorter than its outer, to correspond in shape, to the bead 3 previously mentioned. A central bore 13 extends longitudinally through the screw 10, and the head of the screw is grooved at 14 for the application of a screwdriver.

In the particular embodiment above described, because of the proportional depth and diameter of the receptacle 1, it is preferable to use a screwdriver for assembling the joint, although in some embodiments I can just as well flatten the sides of the head of the screw and use a wrench; or provide the head with a pair of recesses for the application of a spanner wrench.

In assembling the joint, the compressible washer 9 is placed within the recess 6 where it rests upon the seat 7. The receptacle 1 is placed upon the washer with its aperture 2 in alinement with the opening 5 in the fitting 4. The screw 10 is then passed down through the aperture 3 and the washer 9 and is threaded into the opening 5. By the use of a screwdriver, or other suitable tool, the screw 10 may be very tightly drawn down to bind the vessels firmly together. During this operation, the ridge 12 of the screw head enters the bead 3 of the receptacle 1, in order to "back up" or reinforce said bead, and forces said bead downward and embeds it within the upper surface of the compressible packing device or washer 9. At the same time it will compress the washer and squeeze it in both directions about the screw and into firm contact with the vertical wall of the recess 6, as shown in Fig. 1. Because of the more abrupt slope of the inner side of the ridge 12 and bead 3, the metal will be displaced inward, particularly, and be compressed very firmly about the screw 10, thus forming a very effective joint between the vessels.

Having thus described my invention, what I claim is:

1. In combination with two vessels to be joined, one of which is of sheet metal and has an aperture and a V-shaped bead surrounding the same, and the other of which is provided with a threaded opening and a recess surrounding said opening, a compressible washer within said recess, (the recess being of a depth less than the thickness of the washer,) and a tubular screw that passes through the aperture and the washer and is threaded into the aforesaid opening, said screw having a head the underneath surface of which is provided with a ridge that is triangular in cross section to correspond to the shape of the aforesaid bead, the inner slope of each the ridge and the bead being shorter than the outer slope, the ridge being adapted to fit within the bead and embed the same within the compressible washer as the screw is threaded into the aforesaid opening.

2. In combination with two vessels to be joined, one of which is of sheet metal and has an aperture and a bead surrounding the aperture, and the other of which is provided with a threaded opening and a recess surrounding said opening, a compressible washer within said recess, the recess being of a depth less than the thickness of the washer, and a tubular screw passing through the aperture and the washer and threaded into the aforesaid opening, said screw having a head the underneath surface whereof is provided with a ridge, the ridge being adapted to fit within the bead and embed the same within the compressible washer as the screw is threaded into the aforesaid opening.

In testimony whereof, I hereunto affix my signature in the presence of two witnesses.

LEE S. CHADWICK.

Witnesses:
W. E. SHEPPARD,
D. T. SMITH.

Copies of this patent may be obtained for five cents each, by addressing the "Commissioner of Patents, Washington, D. C."